United States Patent
Ogawa et al.

(10) Patent No.: US 11,059,483 B2
(45) Date of Patent: Jul. 13, 2021

(54) VEHICLE CONTROL METHOD AND VEHICLE CONTROL DEVICE

(71) Applicant: Nissan Motor Co., Ltd., Yokohama (JP)

(72) Inventors: Katsuyoshi Ogawa, Kanagawa (JP); Atsuhiro Mori, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/647,064

(22) PCT Filed: Oct. 10, 2017

(86) PCT No.: PCT/JP2017/036625
§ 371 (c)(1),
(2) Date: Mar. 13, 2020

(87) PCT Pub. No.: WO2019/073513
PCT Pub. Date: Apr. 18, 2019

(65) Prior Publication Data
US 2020/0207352 A1    Jul. 2, 2020

(51) Int. Cl.
*B60W 30/18* (2012.01)
*B60K 17/04* (2006.01)

(52) U.S. Cl.
CPC ....... *B60W 30/18145* (2013.01); *B60K 17/04* (2013.01); *B60W 2520/10* (2013.01); *B60W 2520/14* (2013.01); *B60W 2552/40* (2020.02)

(58) Field of Classification Search
CPC ....... B60W 30/18145; B60W 2552/40; B60W 2520/10; B60W 2520/14; B60K 17/04
See application file for complete search history.

(56) References Cited

U.S. PATENT DOCUMENTS

| | | | | |
|---|---|---|---|---|
| 5,742,917 A | * | 4/1998 | Matsuno | B60K 23/04 701/69 |
| 2002/0002437 A1 | | 1/2002 | Matsuno | |
| 2002/0087251 A1 | * | 7/2002 | Kogure | B60T 8/172 701/80 |

FOREIGN PATENT DOCUMENTS

| | | |
|---|---|---|
| CN | 102910171 A | 2/2013 |
| JP | 5-180325 A | 7/1993 |
| JP | 7-17282 A | 1/1995 |
| JP | 8-310267 A | 11/1996 |
| JP | 2005-247276 A | 9/2005 |
| JP | 2005-306281 A | 11/2005 |
| JP | 2007-69844 A | 3/2007 |
| JP | 2007-290508 A | 11/2007 |

(Continued)

*Primary Examiner* — Michael D Lang
(74) *Attorney, Agent, or Firm* — Global IP Counselors, LLP

(57) ABSTRACT

A vehicle control device includes a sensor, a transfer case and a controller. The sensor detects a yaw rate of a vehicle. The transfer case distributes a drive force from a motive power source to front wheels and rear wheels. The controller determines a road surface friction coefficient to be low upon detecting an absolute value of the yaw rate during forward travel of the vehicle to be equal to or greater than a prescribed value other than zero, determines the road surface friction coefficient to be high upon detecting the absolute value is less than prescribed value, and controls a distribution amount of the transfer case based on a determination result of the road surface friction coefficient.

7 Claims, 3 Drawing Sheets

(56) References Cited

FOREIGN PATENT DOCUMENTS

| JP | 2009-184625 A | 8/2009 |
|----|---------------|--------|
| JP | 2011-57154 A | 3/2011 |
| JP | 2011-201507 A | 10/2011 |
| JP | 5033008 B2 | 9/2012 |
| KR | 10-2004-0064407 A | 7/2004 |

* cited by examiner

VEHICLE CONTROL METHOD AND VEHICLE CONTROL DEVICE

CROSS-REFERENCE TO RELATED APPLICATIONS

This application is a U.S. national stage application of International Application No. PCT/JP2017/036625, filed on Oct. 10, 2017.

BACKGROUND

Technical Field

The present invention relates to a method for controlling a vehicle and a device for a controlling a vehicle, the method and device estimating a state of a road surface.

Background Information

Japanese Laid-Open Patent Application No. 2007-290508 (Patent Citation 1) discloses a technique in which a relative difference between road surface friction coefficients of road surfaces with which left and right wheels are in contact is detected according to whether a yaw rate is positive or negative during forward travel.

SUMMARY

However, although it is possible in the technique disclosed in Patent Citation 1 to detect the relative difference between road surface friction coefficients of road surfaces in contact with the left and right wheels, a problem is presented in that it is not possible to detect the magnitude of the road surface friction coefficients.

An object of the present invention is to provide a method for controlling a vehicle and a device for controlling a vehicle, the method and device being capable of estimating a road surface friction coefficient on the basis of a yaw rate signal.

In order to achieve the aforementioned object, the present invention is configured so that when an absolute value of a yaw rate detected during forward travel of a vehicle is equal to or greater than a prescribed value other than zero, it is determined that a road surface friction coefficient is low, and when the absolute value is less than the prescribed value, it is determined that the road surface friction coefficient is high.

It is accordingly possible to estimate a road surface friction coefficient on the basis of a yaw rate.

DETAILED DESCRIPTION OF THE EMBODIMENTS

An embodiment of the present invention is described below with reference to the accompanying drawings.

First Embodiment

Figure 1:
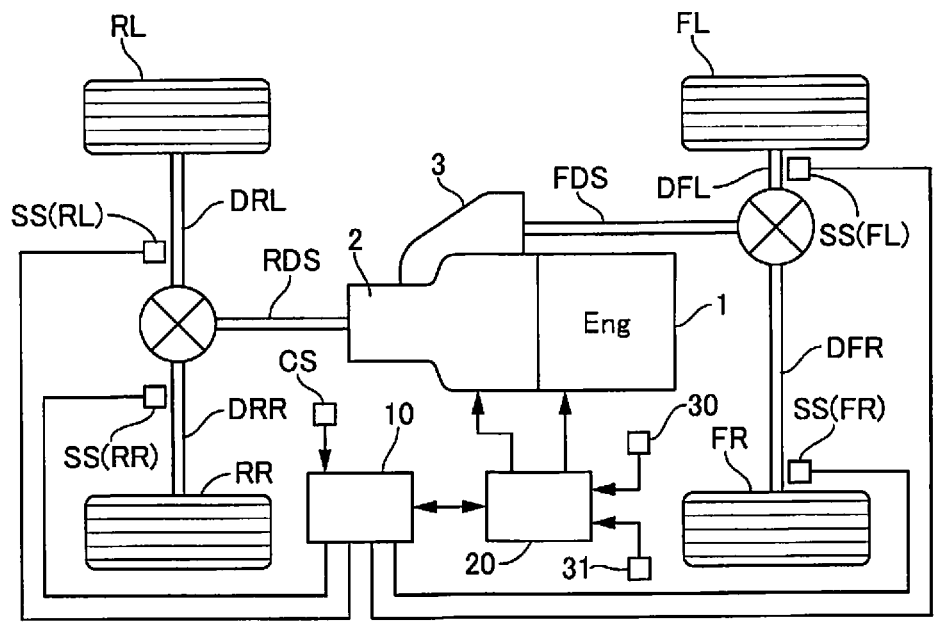
FIG. 1 is a system diagram of a vehicle in accordance with a first embodiment.

FIG. 1 is a system diagram of a vehicle in accordance with an first embodiment. The vehicle in the first embodiment is a four-wheel-drive vehicle having a rear-wheel-drive base. The vehicle has an engine 1, an automatic transmission 2, and a transfer case 3. The automatic transmission 2 shifts a speed of the engine 1 and outputs, from a rear drive shaft RDS, some or all torque outputted from the engine 1. The torque outputted from the rear drive shaft RDS is transmitted to rear wheels RL, RR (also referred to simply as "rear wheels" below) via a rear-left-wheel drive shaft DRL and a rear-right-wheel drive shaft DRR. The transfer case 3 outputs, from a front drive shaft FDS, some of the torque outputted from the engine 1. The torque outputted from the front drive shaft FDS is transmitted to front wheels FL, FR (also referred to simply as "front wheels" below) via a front-left-wheel drive shaft DFL and a front-right-wheel drive shaft DFR.

The vehicle also has: vehicle wheel speed sensors SS (FL, FR, RL, RR) that detect a state of rotation of each of the vehicle wheels FL, FR, RL, RR; a combined sensor CS that detects a front-rear acceleration Gx, a lateral acceleration Gy, and a yaw rate Yaw of the vehicle; a vehicle speed sensor 30 that detects a vehicle speed VSP; and a steering angle sensor 31 that detects a steering amount θ produced by a driver. A brake controller 10 receives sensor signals (pulse signals) from the vehicle wheel speed sensors SS and computes a vehicle wheel speed Vw and/or a vehicle body speed Vx. The vehicle wheel speed sensors SS are described in detail below. Various sensor signals (Gx, Gy, Yaw) from the combined sensor CS are also received.

The brake controller 10 executes, inter alia: an anti-lock brake control (referred to as "ABS" below) for suppressing a tendency of the vehicle wheels to lock, the control being executed on the basis of received sensor signals and computed information; a vehicle dynamics control (referred to as "VDC" below) for stabilizing behavior of the vehicle; and an automatic brake control based on a brake request received from an automatic driving controller (not shown), the brake controller 10 also controlling a state of brakes (not shown).

A controller 20 has an engine control unit that controls a driving state of the engine 1, a gear shifting control unit that controls a gear shift state of the automatic transmission 2, and a drive force distribution control unit that controls a drive force distribution state of the transfer case 3. The engine control unit controls the speed and/or torque of the engine 1 according to, inter alia, a throttle position, a fuel injection amount, and a plug ignition timing. The gear shifting control unit determines an optimal gear shift position on the basis of the vehicle speed VSP and an accelerator pedal position AP0, and shifts gears to the selected gear shift position through controlling an oil pressure within the automatic transmission 2. The drive force distribution control unit computes a drive force to be distributed to the front wheels and a drive force to be distributed to the rear wheels on the basis of a travel state of the vehicle, and controls the torque transmitted to the front-wheel side from the transfer case 3.

The brake controller 10 and the controller 20 are connected via CAN communication wiring. The controller 20 receives the pulse signals of the vehicle wheel speed sensors SS, the vehicle wheel speed Vw, the vehicle body speed Vx, the front/rear acceleration Gx, the lateral acceleration Gy, the yaw rate Yaw, and other such data from the brake controller 10. The brake controller 10 receives engine torque information, the gear shift position, the drive force distribution state, and other such data from the controller 20.

Figure 2:
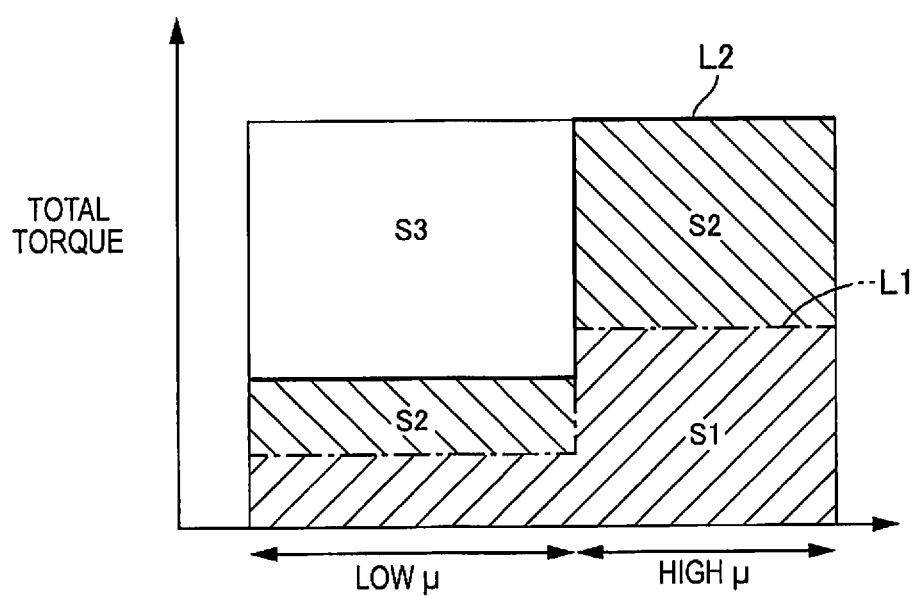
FIG. 2 is a control map for a drive force distribution control of the vehicle in the first embodiment.

FIG. 2 is a control map for a drive force distribution control of the vehicle in the first embodiment. In this map, a road surface friction coefficient (referred to as "road surface μ" below) is represented on the horizontal axis, and a total torque of the front drive shaft FDS and the rear drive shaft RDS is represented on the vertical axis. A threshold value L1 in FIG. 2 represents a maximum value of torque that the rear wheels can transmit to the road surface, and a threshold value L2 represents a maximum value of torque that can be transmitted from both the front wheels and the rear wheels to the road surface. A region S1 below the threshold value L1 in FIG. 2 represents where the vehicle is traveling in rear-wheel drive. Characteristics of the threshold value L1 include that the value of L1 decreases as the road surface μ decreases, and the value of L1 increases as the road surface μ increases. A region S2 above the threshold value L1 in FIG. 2 and below the threshold value L2 represents where the vehicle is traveling in four-wheel drive. The drive force distribution control unit distributes L1 of the torque outputted from the engine 1 to the rear wheels and distributes the remaining torque to the front wheels.

A region S3 above the threshold value L2 in FIG. 2 is a region in which a reduction in torque is requested by the engine 1 during four-wheel-drive travel. The region S3 represents a situation in which, even if L1 of the torque outputted from the engine 1 is distributed to the rear wheels and the difference between L2 and L1 is distributed to the front wheels, excess torque is outputted from the engine 1. In this case, the drive force distribution control unit issues a request to the engine 1 to reduce the torque by a portion obtained by subtracting L2 from the engine torque. As shown in FIG. 2, when the drive force distribution control is executed in the vehicle in the first embodiment, the road surface μ is used. This is because there is a correlation between the road surface μ and the force that can be transmitted from the vehicle wheels to the road surface.

Road Surface μ Estimation Process

Figure 6:
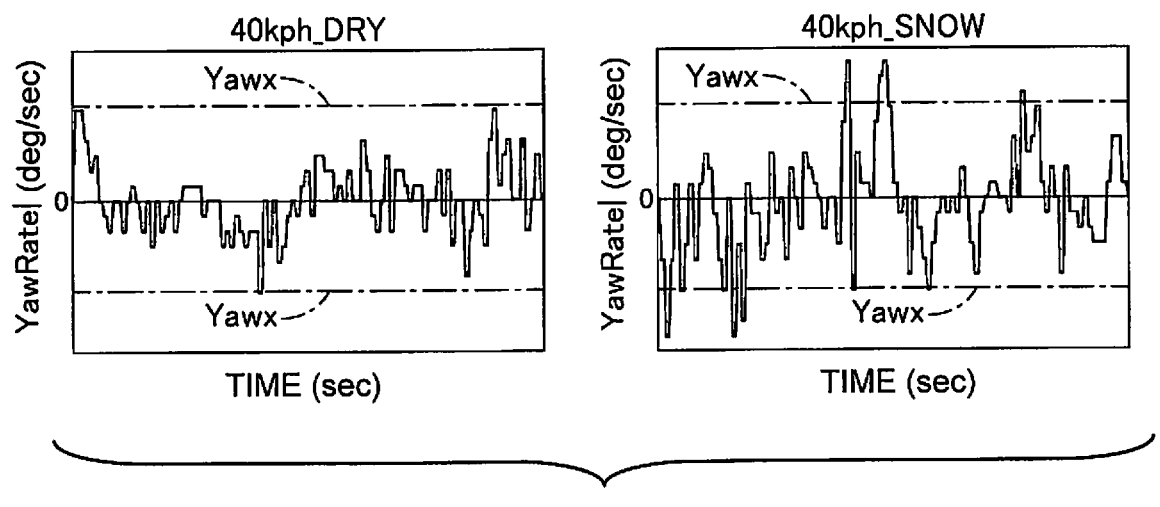
FIG. 6 is a set of time charts representing a change in yaw rate in the first embodiment.

FIG. 6 is a set of time charts representing a change in yaw rate in the first embodiment. The left side of FIG. 6 shows a change in yaw rate during forward travel on a high μ road, and the right side of FIG. 6 shows a change in yaw rate during forward travel on a low μ road. In the case of the high μ road, no change that would exceed the yaw rate threshold value Yawx occurs, but in the case of the low μ road, it is understood that a value exceeding the yaw rate threshold value Yawx is repeatedly detected. This is because a circle of friction of a tire is smaller during forward travel on a low μ road than in the case of a high μ road, and cornering force is relatively low. As a result of thorough investigations, the inventors discovered that when a yaw moment acts on a vehicle due to a split-μ road, any kind of interference, etc., cornering force suppressing this effect is low on a low μ road, and therefore peaks of the yaw rate readily appear. Thus, in the first embodiment, a yaw rate counter is incremented each time an absolute value of the yaw rate Yaw exceeds the yaw rate threshold value Yawx, and a low μ road assessment is made.

Figure 5:
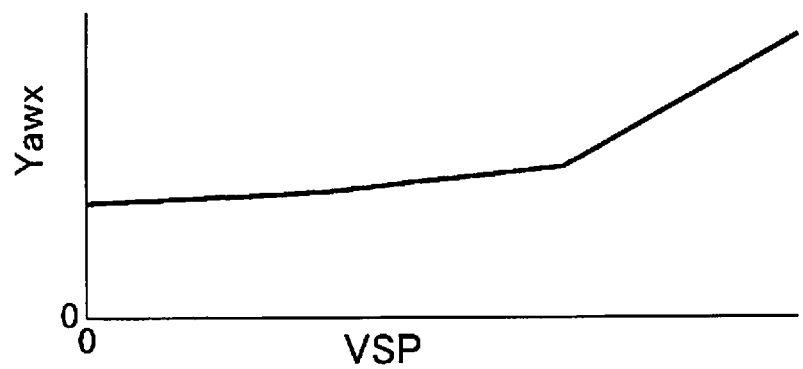
FIG. 5 is a yaw rate threshold value setting map in the first embodiment.

It is important to set the yaw rate threshold value Yawx to a suitable value. When the yaw rate threshold value Yawx is too high, it is impossible to suitably detect the peak of the yaw rate. Conversely, when the yaw rate threshold value Yawx is too low, peaks will be detected excessively. In the first embodiment, the yaw rate threshold value Yawx was set in accordance with the vehicle speed VSP. FIG. 5 is a yaw rate threshold value map in a low μ assessment process in the first embodiment. When the vehicle speed VSP is high, the yaw rate is readily generated even if there is a slight amount of interference, and therefore the value set as the yaw rate threshold value Yawx increases commensurately with an increase in the vehicle speed VSP. The peak of the yaw rate is thereby suitably detected.

Figure 3:
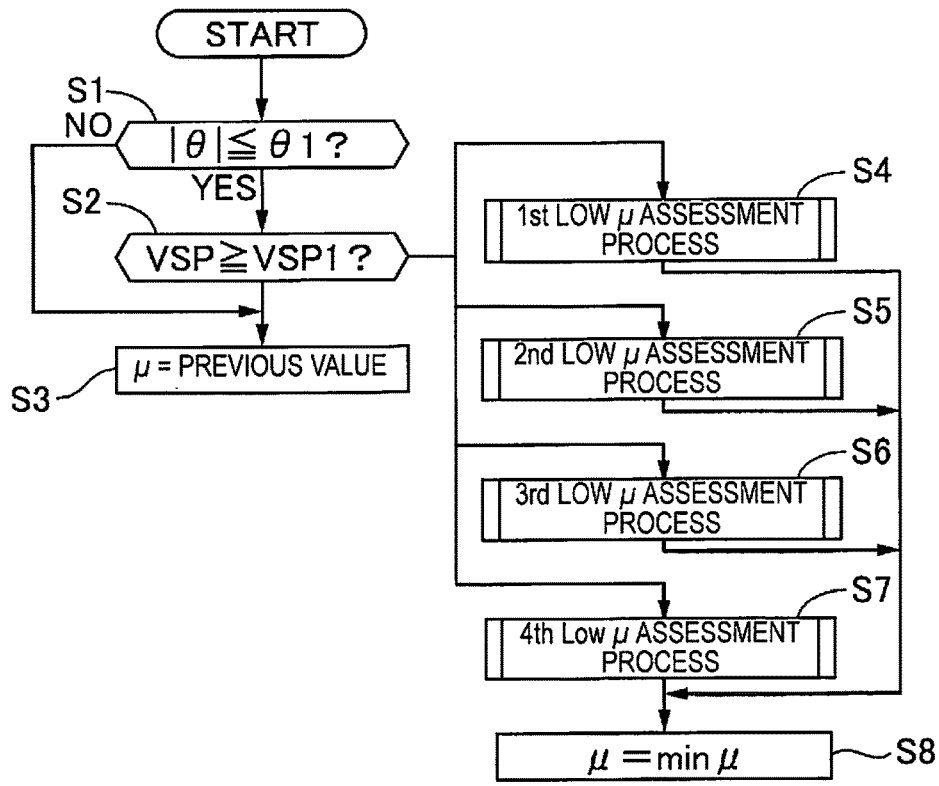
FIG. 3 is a flow chart representing a method for estimating road surface $\mu$ in the first embodiment.

FIG. 3 is a flow chart representing a method for estimating road surface μ in the first embodiment.

In step S1, a judgment is made as to whether the absolute value of the steering amount θ is equal to or less than a prescribed value θ1 (e.g., 10°). When the steering amount θ is equal to or less than the prescribed value θ1, it is judged that a forward travel state is in effect, and the process advances to step S2; otherwise, it is judged that a steering state, i.e., a non-forward travel state, is in effect, and the process advances to step S3.

In step S2, a judgment is made as to whether the vehicle speed VSP is equal to or greater than a prescribed vehicle speed VSP1 (e.g., 20 km/h). When the vehicle speed VSP is equal to or greater than VSP1, the process advances to steps S4, S5, S6, and S7; otherwise, the process advances to step S3. This is because, at a low vehicle speed in a forward travel state, a yaw rate is not especially produced.

In step S3, the previous value (road surface μ set in the previous control process) is set as the road surface μ.

In step S4, there is executed a first low μ assessment process for starting a low μ assessment process immediately after conditions in step S1 and S2 have been satisfied. The low μ assessment process is described below.

In step S5, there is executed a second low μ assessment process for starting a low μ assessment process at a delay of 0.5 seconds after the start of the first low μ assessment process. In step S6, there is executed a third low μ assessment process for starting a low μ assessment process at a delay of 1 second after the start of the first low assessment process, and in step S7, there is executed a fourth low μ assessment process for starting a low μ assessment process at a delay of 1.5 seconds after the start of the first low μ assessment process. The reason why the low μ assessment processes are executed 0.5 seconds apart from each other is described below.

In step S8, the road surface μ determined in the first to fourth low μ assessment processes is subjected to a select-low operation. When it has been determined in any of the low μ assessment processes that the road is a low μ road, it is determined that the road is a low μ road. However, when it has not been determined in any of the low μ assessment processes that the road is a low μ road; i.e., when it has been determined in all processes that the road is a high μ road, it is determined that the road is a high μ road.

Figure 4:
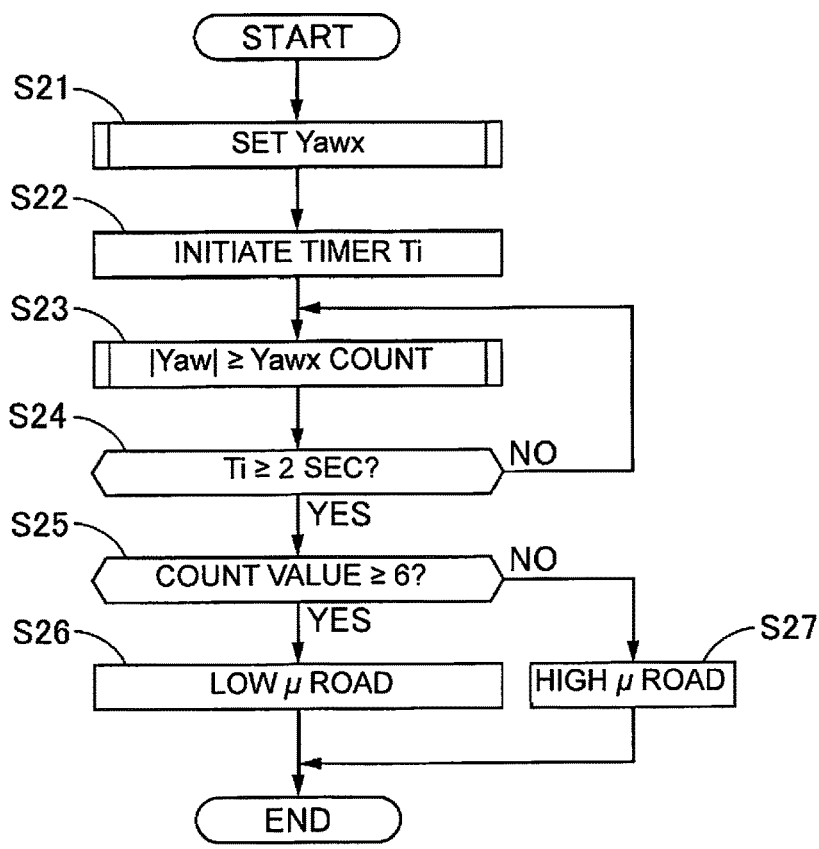
FIG. 4 is a flow chart representing a low $\mu$ assessment process in the first embodiment.

FIG. 4 is a flow chart representing a low μ assessment process in the first embodiment.

In step S21, the yaw rate threshold value Yawx is set on the basis of the vehicle speed VSP.

In step S22, a count of a timer Ti for assessment is started.

In step S23, a yaw rate counter that counts the number of times that the absolute value of the yaw rate Yaw detected from the sensors has been equal to or greater than the yaw rate threshold value Yawx is incremented.

In step S24, a judgment is made as to whether the timer Ti has reached or exceeded 2 seconds. When the timer Ti has reached or exceeded 2 seconds, the process advances to step S25; otherwise, the yaw rate counter continues to be incremented. In the first embodiment, a time of 2 seconds is set, but another suitable number of seconds can be set on the basis of experimentation, etc. For example, when the time is set to 4 seconds, the first to fourth low μ assessment processes are started 1 second apart from each other. The reason for this is described below.

In step S25, a judgment is made as to whether the count value of the yaw rate counter is equal to or greater than 6. When the count value is equal to or greater than 6, the process advances to step S26, and it is determined that the road is a low μ road; when the count value is less than 6, the process advances to step S27, and it is determined that the road is a high μ road. In the first embodiment, a value of 6 is set, but another suitable count value may be set on the basis of experimentation, etc.

In the road surface μ estimation process in the first embodiment, there are executed first to fourth low μ assessment processes in which the aforementioned low μ assessment processes were offset in increments of 0.5 seconds. Specifically, for example, after 0.5 seconds has elapsed from the start of the first low μ assessment process, the second low μ assessment process is started using the same data as was used in the first low assessment process. This configuration is used in order to avoid erroneous assessment by a reduction in the count value of the yaw rate counter due to bias in a scenario in which the yaw rate Yaw exceeds the yaw rate threshold value Yawx. Specifically, in the low μ assessment process, because the assessment is made over the course of 2 seconds, there is a concern that if the count value from a point in time when 1.5 seconds has elapsed after the start of counting of the timer Ti to a point in time when 2 sec has elapsed is 5, and if the count value from the point in time when 2 seconds has elapsed to a point in time when 2.5 sec has elapsed is 2, then it will be determined that both count values are less than 6 and that the road is a high μ road. Thus, by executing four low μ assessment processes that are offset in increments of 0.5 seconds, bias of the count value is eliminated despite a judgment having been made on the basis of a count value over the course of 2 seconds, and a stabilized assessment of a low road is achieved.

As described above, the first embodiment exhibits the following effects.

(1) The yaw rate Yaw of the vehicle is detected. When the absolute value of the yaw rate Yaw detected during forward travel of the vehicle is equal to or greater than the yaw rate threshold value Yawx (a prescribed value other than zero), it is determined that the road surface friction coefficient is low; when the absolute value is less than the yaw rate threshold value Yawx, it is determined that the road surface friction coefficient is high. Accordingly, the road surface friction coefficient can be estimated on the basis of the yaw rate.

(2) The yaw rate threshold value Yawx is greater when the vehicle is traveling at high speed than when the vehicle is traveling at low speed (see FIG. 5). Accordingly, a suitable yaw rate threshold value Yawx that corresponds to a travel state can be set, and erroneous assessment can be avoided.

(3) The vehicle comprises: the combined sensor CS, which detects the yaw rate Yaw; the transfer case 3, which distributes the drive force of the engine 1 to the front wheels and the rear wheels; and the controller 10, which assesses that the road surface friction coefficient is low when the absolute value of the yaw rate Yaw detected during forward travel of the vehicle is equal to or greater than the yaw rate threshold value Yawx (a prescribed value other than zero), assesses that the road surface friction coefficient is high when the absolute value is less than the yaw rate threshold value Yawx, and controls the amounts of drive force distributed by the transfer case 3 on the basis of the result of this assessment of the road surface friction coefficient. Accordingly, the control of the drive force distribution by the transfer case 3 can be suitably executed on the basis of the road surface μ, and a stabilized travel state can be implemented while ensuring drive force.

Other Embodiments

The present invention is described above on the basis of one embodiment, but other specific configurations may be employed. In the first embodiment, an example of application to a four-wheel-drive vehicle having a rear-wheel-drive base was indicated; however, application to a four-wheel-drive vehicle having a front-wheel-drive base may be employed. Also, in the first embodiment, a road surface friction coefficient used when controlling the distribution of drive force was estimated; however, a road surface friction coefficient used when controlling braking, controlling turning, or in other such controls may also be estimated.

The invention claimed is:

1. A vehicle control method comprising:
 detecting a yaw rate of a vehicle;
 determining whether the vehicle is in a forward travel state, the forward travel state being a state in which a steering amount of the vehicle is equal to or less than 10°;
 comparing an absolute value of the yaw rate to a prescribed value other than zero; and
 determining a road surface friction coefficient to be low upon detecting that the absolute value of the yaw rate during the forward travel state is equal to or greater than the prescribed value, and determining the road surface friction coefficient to be high upon detecting that the absolute value of the yaw rate during the forward travel less than the prescribed value.

2. The vehicle control method according to claim 1, further comprising:
 setting the prescribed value to be greater when the vehicle is traveling at a high speed than when the vehicle is traveling at a low speed.

3. The vehicle control method according to claim 1, further comprising:
 determining whether a vehicle speed of the vehicle is larger than or equal to a prescribed vehicle speed and using a previous value of the road surface friction coefficient if the vehicle speed is not larger than or equal to the prescribed vehicle speed.

4. A vehicle control device comprising:
 a sensor that detects a yaw rate of a vehicle;
 a transfer case that distributes a drive force from a motive power source to front wheels and rear wheels; and
 a controller configured to
  determine whether the vehicle is in a forward travel state;
  compare an absolute value of the yaw rate to a prescribed value other than zero,
  determine a road surface friction coefficient to be low upon detecting that the absolute value of the yaw rate during the forward travel state is equal to or greater than the prescribed value,
  determine the road surface friction coefficient to be high upon detecting that the absolute value is less than the prescribed value, and control a distribution amount of the transfer case based on a determination result of the road surface friction coefficient.

5. The vehicle control device according to claim 4, wherein the controller is further configured to determine that the vehicle is in the forward travel state when an absolute value of a steering amount is equal to or less than a prescribed steering amount.

6. The vehicle control device according to claim 5, wherein the prescribed steering angle amount is 10°.

7. The vehicle control device according to claim 4 the controller is further configured to determine whether a vehicle speed of the vehicle is larger than or equal to a prescribed vehicle speed and use a previous value of the road surface friction coefficient if the vehicle speed is not larger than or equal to the prescribed vehicle speed.

* * * * *